Patented Jan. 5, 1937

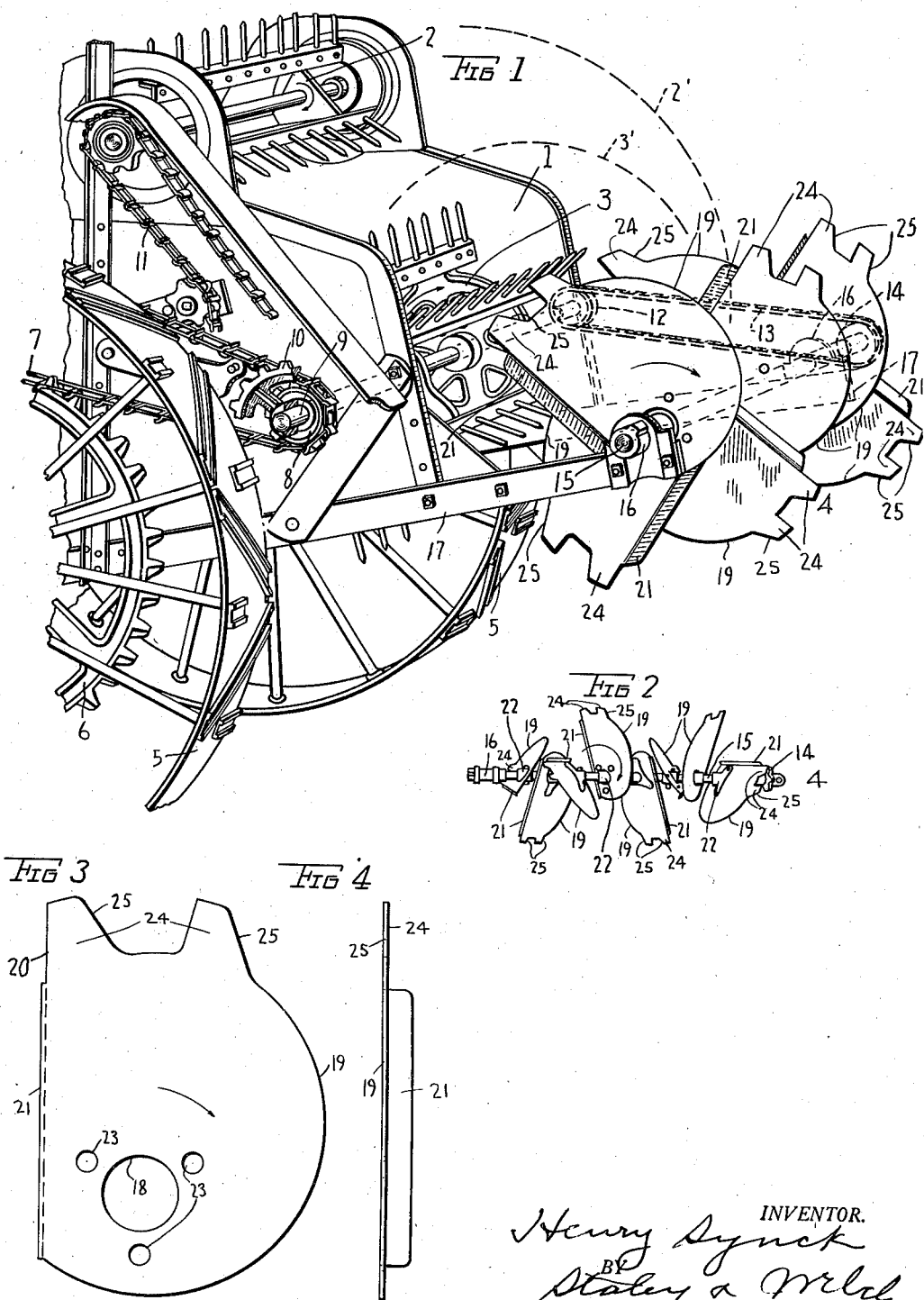

2,066,862

UNITED STATES PATENT OFFICE 2,066,862

DISTRIBUTOR BLADE FOR MANURE SPREADERS

Henry Synck, Coldwater, Ohio, assignor to The New Idea Spreader Company, Coldwater, Ohio, a corporation of Ohio Application November 7, 1934, Serial No. 751,890

2 Claims. (Cl. 275—6)

This invention relates to improvements in manure spreaders, it more particularly relating to improvements in the distributor blades.

In the class of spreaders to which the invention is especially adaptable, there are usually found two rotary pulverizing cylinders and a rotary distributing cylinder all positioned at the rear of the bed with their axes of rotation transversely disposed to the longitudinal extension of the bed. In the bottom of the bed is a conveyor chain which moves the load toward the rear end. One pulverizer cylinder is located at the end of the bed and operates on the major portion of the load. The second pulverizer is positioned slightly above and forwardly of the lower pulverizer and takes care of the upper portion of the load and is therefore somewhat smaller than the lower. These cylinders are known as pulverizers because their functions include that of tearing the load to shreds as the load approaches them; secondly, of throwing the shredded material onto the distributing cylinder which is located at the rear of and slightly above the lower pulverizer.

The principal function of the distributor is to scatter or broadcast the material on the ground uniformly. As stated, the material is thrown on the distributor, the speed of rotation, the size and location of the pulverizers being taken into consideration so that the paths taken by the material thrown by the respective pulverizers will converge near the shaft line of the distributor, which zone is known as the receiving zone of the distributor. Distributor blades at first were more or less plain rectangular sheet metal members, perhaps with some portion thereof bent to provide an angularly disposed surface in order to strike with a glancing blow the material coming through the air toward the receiving zone. In these early blades and other blades which followed minor improvements were made from time to time, mainly directed to providing self clearing blades, since in much of the material to be spread there was often found substances as corn stalks, vines or pieces of twine which clung to the edge of the blades and poor distribution resulted.

In an effort to improve on the distribution and to eliminate clogging, there was produced an eccentrically mounted, obliquely positioned blade having its leading edge formed on the order of an involute curve whereby particles of material engaged by the leading edge were forced to a ride upwardly and outwardly along the involute curve to a point where the centrifugal force was greatest so as to throw the material from the blade with the most lateral force, and consequent best lateral distribution.

While this form of distributor blade was effective for the purpose of broadcasting the material, occasionally there would exist some large particles or chunks of material as well as stalks which escape the pulverizing action of the pulverizing cylinders and need further breaking up.

An object of the invention is the provision of an improved distributor blade capable of further shredding or breaking up of the material whereby a still more uniform broadcasting thereof is obtained without the loss of the self-clearing features.

A further and more specific object of the invention is the provision of an improved distributor blade which is equipped with tooth-like projections which act to disintegrate any large particles of solid matter which have escaped the pulverizing action of the pulverizing cylinders, such teeth or projections having the slope of their leading edges such that a sufficiently abrupt change from the otherwise comparatively smooth contour of the involute curve will exist to afford the most efficient action not only in disintegrating large particles of material but also in preventing such particles as twine from clinging to the teeth in their rotative motion.

In the accompanying drawing:

Fig. 1 is a perspective fragmentary view of the rear end of a spreader, showing the distributing cylinder to which are added the improved blades.

Fig. 2 is a detailed view in perspective of the distributing cylinder alone, the view being on a smaller scale as compared to Fig. 1.

Fig. 3 is a plan view in detail of one of the improved blades.

Fig. 4 is a view of the same blade when looking at its edge.

Referring to the drawing, I represents the bed of the spreader, 2 the upper pulverizing cylinder, and 3 the lower pulverizer, while the distributing cylinder is indicated in general at 4. Each of the pulverizers and the distributor revolve in the same direction, as indicated by the arrows, and are driven by chains and sprockets. The bed is carried on wheels, but a portion only of the rear drive wheels is shown at 5. When the machine is drawn the drive wheels rotate, by means not shown, a large sprocket wheel, a portion of which is shown at 6. Over the sprocket 6 is passed a chain 7 which in turn passes over and drives a sprocket 8 on the near end of the shaft 9 of the lower pulverizer cylinder 3. On the same end of the shaft 9 is seen a fragment of a sprocket 10 over which is passed the fragment of chain 11 whereby the upper pulverizer is driven. On the opposite or far end of the lower pulverizer shaft 9 is a sprocket 12 connected by a chain 13 to a sprocket 14 positioned on the corresponding end of the distributor shaft 15. The distributor shaft 15 is carried in bearings 16 which are only conventionally shown; these bearings are secured at the outer extended ends of a pair of projecting frame members 17 attached to the bed 1 proper.

The distributing cylinder comprises the aforementioned shaft 15 and the sprocket 14 and the improved blades. Referring to Fig. 3 in which one of the improved blades is shown in plan, it can be seen that the blade is produced from a flat piece of sheet metal and the direction in which it rotates is shown by the arrow thereon. A large circular opening 18 is provided through which the shaft 16 is later inserted. As seen, the opening 18 is eccentrically placed with respect to the nearly circular outline represented by the leading edge 19, this edge being spoken of as being nearly circular because it is not truly circular but more on the order of an involute curve of a circle. Since the right hand portion of the blade is the effective portion, most of the left hand side can be eliminated as is indicated by the cutting away of this side to the straight line 20 fairly close to the opening tangentially thereto. A portion of the metal along the straight side 20 is turned down as at 21 to provide a suitable stiffness to the blade.

The blades are attached to the shaft 9 by means of spiders 22 conventionally shown in Fig. 2, a spider consisting of a hub portion and a plurality of outwardly extending arms to which the blade is secured by rivets passed through the openings 23 therein. The arms of the spider are peculiarly positioned with respect to the hub portion in that when the blade is attached thereto and the spider is placed on the shaft, the blade is obliquely positioned with respect to the axis of rotation of the shaft. By the use of right and left hand spiders the blades may be placed on the shaft so that four have the same oblique position and the other four on the other end of the shaft have an opposite oblique position. In Fig. 1 the two curved broken lines 2' and 3' indicate the approximate path of the material thrown by the pulverizing cylinders 2 and 3, the paths being made to converge at the receiving zone of the distributor. It can be seen that material coming through the air from the pulverizers and meeting a blade on its upward movement will be cast to the right or left according to its oblique position on the shaft.

The material generally contains straw, stalks, twine, etc., intermixed with animal matter which comes through the air in such manner as to be met by the oblique face and the leading edge of a blade, and the purpose of the involute leading edge of the blade is seen, as this edge has a sort of camming effect to force the material outwardly along the face of the blade near the involute curve to that portion of the blade most remote from the axis of rotation where the action of centrifugal force is greatest and the stalks or twine is thrown off the blade and not retained as by some of the blades made according to the prior art. Also, that when comparatively large particles will be discharged by one or both of the pulverizing cylinders, these larger particles would have a better effect if a further subdivision were to be made on them. To provide the better breaking up of these larger particles is the object of the improved blade and the means by which it is accomplished is now explained.

If a large particle meets the curved leading edge it is conceivable that if the material was rather tough the edge would no more than cam the particle outwardly along the edge as explained in reference to the stalks or twine. To actually break the particle, I provide a plurality of projections 24 which extend outwardly from the blade where the radius from the shaft center as represented by the opening 18 is greatest. Obviously the projections also have a leading edge denoted at 25, the angle of which with respect to the involute curve and to the axis of rotation is such that at once there is sufficient change from the smooth curve of the involute edge to sever or break a particle carried upwardly along the involute edge, even to the extent of cutting or breaking stalks, but still not so great that twine, or a stalk which resists breaking, will be caught as by a hook and carried around the cylinder to eventually lead to entanglement thereon.

Although one projection or several could be employed, I show the preferred number of two, this number being found in practice to be sufficient.

Having thus described my invention, I claim:

1. In a machine of the character described, a transversely arranged rotatable distributor shaft, a distributor blade connected to rotate therewith, said blade being positioned obliquely to the axis of rotation of said shaft, said blade having a smooth curved edge which increases in distance from the axis of rotation in a direction reverse to the direction of rotation, and at least one tooth projecting from said curved edge located only adjacent the point of greatest distance from the axis of rotation of said blade, the forward edge of said tooth providing an abrupt change in the otherwise smooth curved edge of the blade.

2. In a machine of the character described, a transversely arranged rotatable distributor shaft, a distributor blade connected to rotate therewith, said blade being positioned obliquely to the axis of rotation of said shaft, said blade having a curved edge which increases in distance from the axis of rotation in a direction reverse to the direction of rotation, a plurality of teeth projecting from said curved edge located only adjacent the point of greatest distance from the axis of rotation of said blade, the forward edge of each of said teeth being inclined in a direction reverse to the direction of rotation of said blade, the remaining portion of the edge of said blade being formed on a smooth curve devoid of teeth or projections.

HENRY SYNCK.